Oct. 4, 1966    R. W. BEEBE    3,277,259
FLOAT SWITCH FOR CLOSING AUTOMOBILE WINDOWS
AND ERECTING CONVERTIBLE TOPS
Filed Feb. 2, 1965    2 Sheets-Sheet 1

INVENTOR
RODERICK W. BEEBE

BY *Nolte & Nolte*

ATTORNEYS

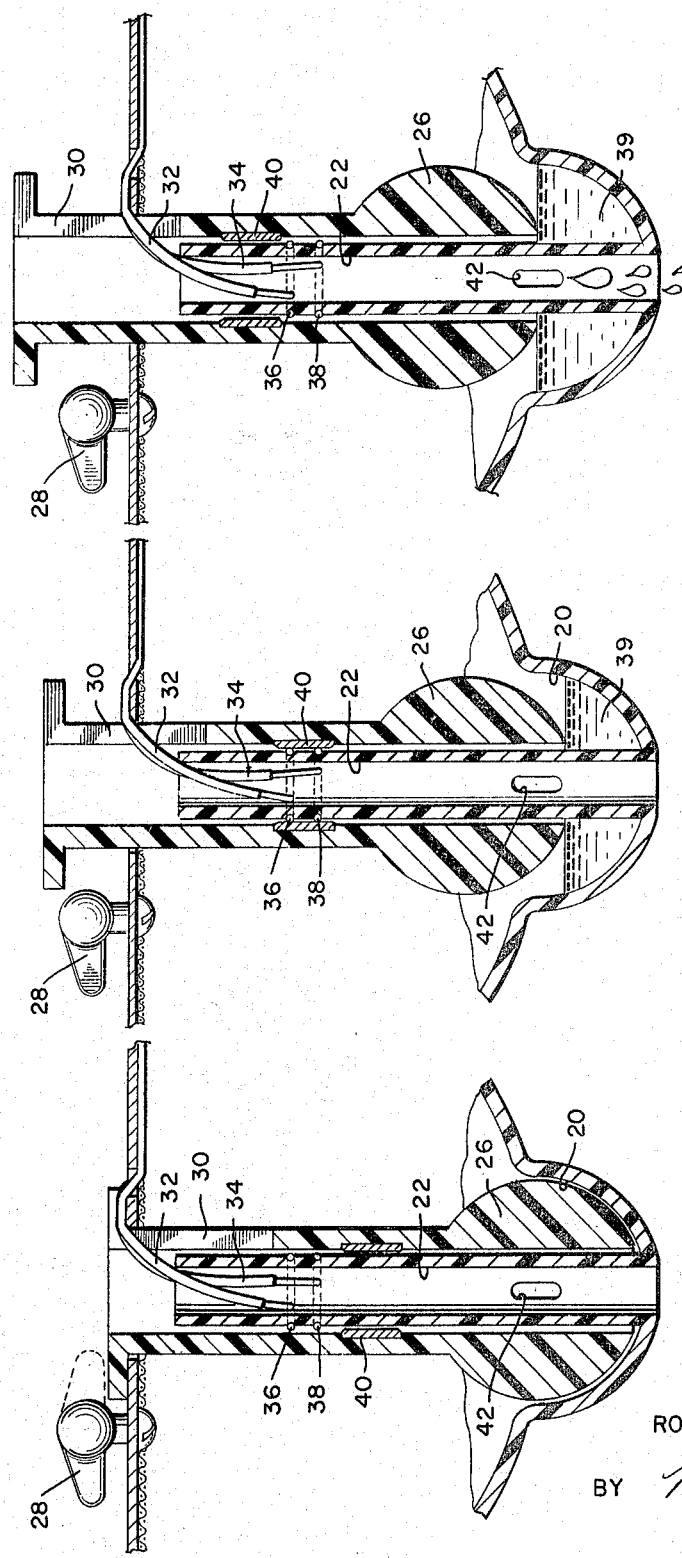

United States Patent Office 3,277,259
Patented Oct. 4, 1966

3,277,259
FLOAT SWITCH FOR CLOSING AUTOMOBILE WINDOWS AND ERECTING CONVERTIBLE TOPS
Roderick W. Beebe, Huntington, N.Y., assignor of two-thirds to Roderick W. Beebe and one-third to Albert C. Nolte, New York, N.Y.
Filed Feb. 2, 1965, Ser. No. 429,839
3 Claims. (Cl. 200—84)

This invention relates to devices for closing windows and putting up convertible tops of automobiles.

It is known to have a device which will actuate a power source in an automobile by which windows are closed automatically in a car upon which rain begins to fall. The device is activated by the rainwater falling upon the car and being caught in an appropriate collecting system. Such an invention is shown in the Davis Patent 2,640,958.

The present invention is of a type which can be installed by the manufacturer as original equipment or may be added to the vehicle at any time thereafter by the owner. It can be styled to go well with any car, and can be made inconspicuous or conspicuous, depending upon the wishes of the purchaser, a factor of considerable importance in devices of this type.

The installation calls for the drilling of three holes at the points of attachment. The only other requirement is the connection of the electrical leads to the appropriate mechanism to permit said mechanism to operate when the device is actuated by rain.

It is a primary object of the invention to provide a device which will close a soft or convertible top of a parked automobile when rainfall begins.

It is a further object of the present invention to provide a device of the character described which can be installed in an automobile as an accessory after manufacture.

The above and other objects will become more readily understood by reference to the following detailed description read in conjunction with the accompanying drawings in which:

FIG. 4 is a detailed section view of the electrical activating device shown prior to electrical contact;

FIG. 5 is the view of FIG. 4 showing the floating member making electrical contact;

FIG. 6 is the view of FIG. 4 showing the electrical contact disconnected by the surplus water in the well.

Figure 1:
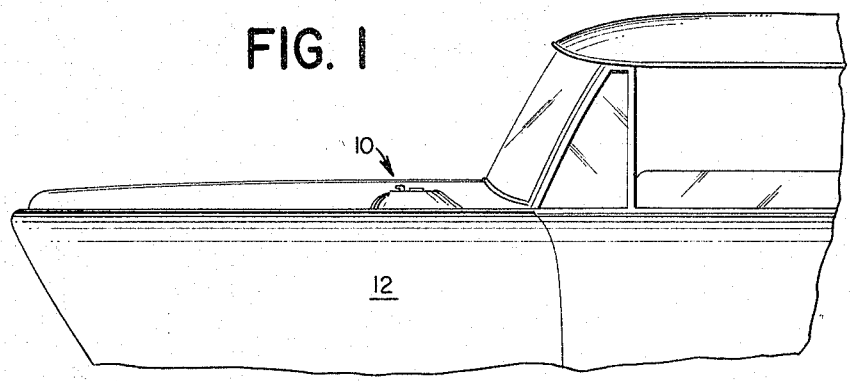
FIG. 1 is a side elevation of a vehicle showing a preferred embodiment of the present invention.
Figure 2:
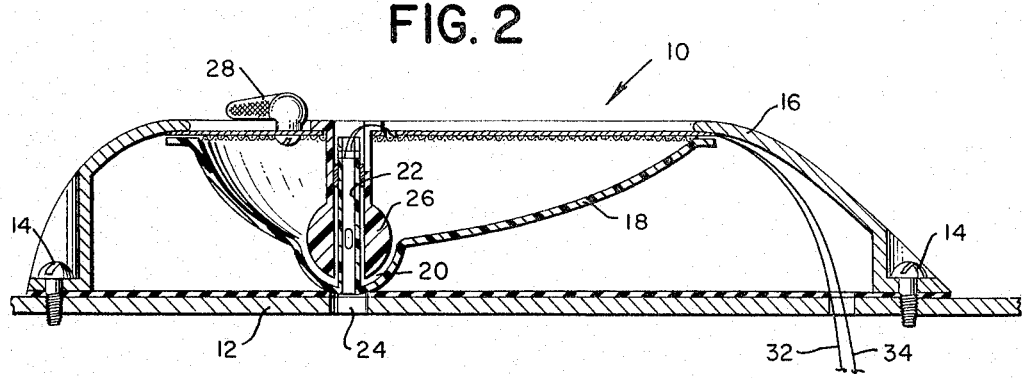
FIG. 2 is a longitudinal section, in an enlarged scale of the present invention.
Figure 3:
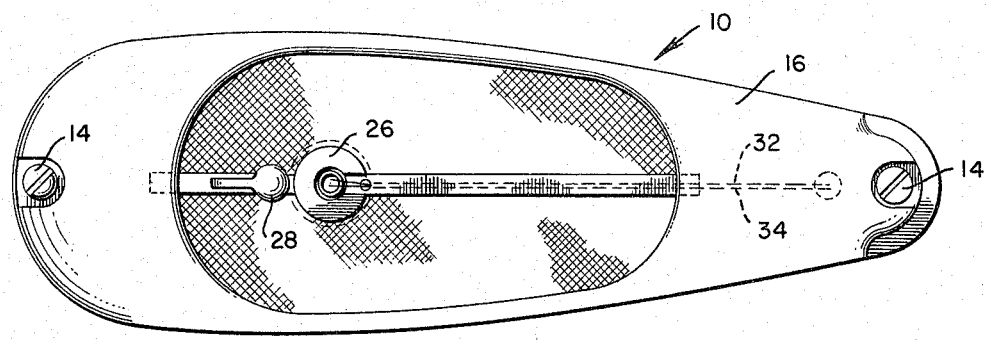
FIG. 3 is a plan view of a preferred embodiment of the present invention.

The device according to the invention 10 is mounted upon any suitable portion of a vehicle, a car fender 12 being the choice for illustrative purposes. The device is attached to the vehicle by screw means 14. The body of the invention 16 contains a shallow collecting trough 18 and well or depression 20 therein. A vertical cylinder 22 an integral part of the interior structure, is so mounted in this well so as to come in contact with a hole 24 drilled in the car fender 12.

A float 26, which is normally held in the down position by lock 28, is so positioned around cylinder 22 so as to move freely thereon when water, collected in the well 20, moves it upwards.

Float 26 has an upper portion 30, best seen in FIGS. 4–6, which is notched or cut in such a manner as to present easy passage of electrical leads 32 and 34 therethrough. Electrical leads 32 and 34 are in turn connected to bands 36 and 38 respectively, both circumferentially connected to cylinder 22.

The operation of this invention is initiated by an accumulation of rainwater 39 in the well 20. Upon such accumulation, the float 26 is caused to move vertically upwards, around the cylinder 22.

The float 26 has embedded concentrically about it, an electrical conducting band 40, which moves along with the rising float 26, until it makes contact with contact bands 36 and 38, which are indirectly connected to electrical leads 32 and 34. When contact between band 40 and bands 36 and 38 is made, an operative connection between electrical leads 32 and 34 is thereby also made.

When leads 32 and 34 are so connected, the motor system which is part of the vehicle, is activated, thereby performing any desired operation, such as the closing of windows, closing the soft top of a convertible, etc.

Upon further rain collecting in the well, the float moves further upward on its cylinder axis and, as shown in FIG. 6, breaks off the metal to metal contact. At this point the excess water in the collecting well is drained off by means of an exit hole 42 and thence to the underpart of the fender 12.

The present invention utilizes the electrical wiring, motors and related mechanisms already present in many of today's vehicles. It will normally be utilized for rolling up the windows and putting up the top. Hence it is only necessary to connect the device according to the invention to these mechanisms in any convenient manner in order to incorporate its features and advantages on a vehicle. In sedans or other hard top vehicles, of course, the window closing operation alone would be utilized. And although the power controlling means to be utilized or energized by the device must be electrical, the operating means for closing the top or windows may be electrical, mechanical or hydraulic, or any combination thereof.

It is believed that the operation of the device will be fully understood from the above description. This disclosure describes a preferred embodiment of my invention but should not be limited to the details of the disclosure, but rather by the scope of the claims below.

What I claim is:

1. A device adapted for use with a vehicle for electrically closing vertically moving windows and convertible tops, said device being attachable by suitable means to the body of said vehicle, said device comprising a well having a chamber with a surface area smaller than the surface area of said well, said chamber being formed by a depression in said well, a float resting in said chamber having vertical freedom of motion and having a hollow cylindrical center along its axis, a vertical upstanding element secured to the base of said well and adapted to slidably engage said float within its hollow center portion, and generally concentric therewith, said element having one or more electrical contacts secured along its outer circumference and adapted to engage a second set of electrical contacts secured along its outer circumference and adapted to engage a second set of electrical contacts secured along the inner circumference of said hollow cylindrical portion of said float, said float having a first position below and out of engagement with said electrical contact, said float having a second position for engaging said electrical contact when a predetermined amount of water enters said well and thereby actuating the control mechanism, said float having a third position above said contacts when an additional amount of water has entered said well so as to cause said float to break the engagement of said first and second electrical contacts so as to automatically disconnect said electrically controlled mechanism, and a drain slot in said vertical upstanding element communicative with the water in said well and positioned along its circumference at a height sufficient to maintain said float in said third position.

2. The mechanism as recited in claim 1, additionally comprising a releasable lock means mounted on the body of said vehicle engageable with the upper portion of said float and maintaining said float in said first position when there is no water in said well, and releasing said float when a predetermined amount of water fills the well.

3. A device adapted for use with a vehicle for electrically closing vertically moving windows and convertible tops, said device being attachable by suitable means to the body of said vehicle, said device comprising a well having a chamber with a surface area smaller than the surface area of said well, said chamber being formed by a depression in said well, a float resting in said chamber having vertical freedom of motion and having a hollow cylindrical center along its axis, a vertical upstanding element secured to the base of said well and adapted to slidably engage said float within its hollow center portion, and generally concentric therewith, said element having one or more electrical contacts secured along its outer circumference and adapted to engage a second set of electrical contacts secured along the inner circumference of said hollow cylindrical portion of said float, said float having a first position below and out of engagement with said electrical contact, said float having a second position for engaging said electrical contact when a predetermined amount of water enters said well and thereby actuating the control mechanism, said float having a third position above said contacts when an additional amount of water has entered said well so as to cause said float to break the engagement of said first and second electrical contacts so as to automatically disconnect said electrically controlled mechanism, a drain slot in said vertical upstanding element communicative with the water in said well and positioned along its circumference at a height sufficient to maintain said float in said third position, and a releasable lock means mounted on the body of said vehicle engageable with the upper portion of said float and maintaining said float in said first position when there is no water in said well, and releasing said float when a predetermined amount of water fills the well.

References Cited by the Examiner

UNITED STATES PATENTS

| 1,347,944 | 7/1920 | Gervasoni et al. | 200—84 |
| 2,640,958 | 6/1953 | Davis | 200—84 X |

BERNARD A. GILHEANY, *Primary Examiner.*

H. A. LEWITTER, *Assistant Examiner.*